United States Patent
Pisoni et al.

(10) Patent No.: US 11,967,033 B1
(45) Date of Patent: Apr. 23, 2024

(54) RENDERING VIRTUAL ENVIRONMENTS BASED ON INTENTS IDENTIFIED IN NATURAL LANGUAGE INPUTS USING MACHINE LEARNING MODELS

(71) Applicant: INTUIT INC., Mountain View, CA (US)

(72) Inventors: David A. Pisoni, San Jose, CA (US); Nigel T. Menendez, Alameda, CA (US); Richard J. Becker, Alberta (CA)

(73) Assignee: INTUIT INC., Mountain View, CA (US)

( * ) Notice: Subject to any disclaimer, the term of this patent is extended or adjusted under 35 U.S.C. 154(b) by 0 days.

(21) Appl. No.: 18/345,169

(22) Filed: Jun. 30, 2023

(51) Int. Cl.
*G06T 19/00* (2011.01)
*G06F 40/30* (2020.01)
*G06V 30/19* (2022.01)

(52) U.S. Cl.
CPC ............ *G06T 19/006* (2013.01); *G06F 40/30* (2020.01); *G06V 30/19173* (2022.01)

(58) Field of Classification Search
USPC ........................................................ 345/633
See application file for complete search history.

(56) References Cited

U.S. PATENT DOCUMENTS

| | | | |
|---|---|---|---|
| 2009/0192785 A1* | 7/2009 | Cavender | G06T 19/00 704/9 |
| 2018/0314689 A1* | 11/2018 | Wang | G10L 15/1822 |
| 2023/0128422 A1* | 4/2023 | Li | G10L 15/24 345/156 |
| 2023/0316594 A1* | 10/2023 | Lai | G06F 9/453 345/629 |

\* cited by examiner

*Primary Examiner* — Michael J Cobb
(74) *Attorney, Agent, or Firm* — Patterson + Sheridan, LLP

(57) ABSTRACT

Certain aspects of the present disclosure provide techniques for rendering visual artifacts in virtual worlds using machine learning models. An example method generally includes identifying, based on a machine learning model and a streaming natural language input, an intent associated with the streaming natural language input; generating, based on the identified intent associated with the streaming natural language input, one or more virtual objects for rendering in a virtual environment displayed on one or more displays of an electronic device; and rendering the generated one or more virtual objects in the virtual environment.

20 Claims, 4 Drawing Sheets

US 11,967,033 B1

RENDERING VIRTUAL ENVIRONMENTS BASED ON INTENTS IDENTIFIED IN NATURAL LANGUAGE INPUTS USING MACHINE LEARNING MODELS

INTRODUCTION

Aspects of the present disclosure relate to virtual reality and augmented reality systems, and more specifically to rendering virtual environments in virtual reality and/or augmented reality systems based on natural language inputs.

BACKGROUND

In computing systems, a user interacts with applications executing locally or on a remote system via a user interface that displays information to the user or allows the user to input information into these applications. For example, users typically interact with these applications using input devices such as keyboards, mice, touch-screens, or the like, and output is usually provided to users through display devices such as monitors and/or sound devices such as speakers or headphones. Due to the inherent limitations in these forms of input and output, emerging technologies such as virtual reality (VR) and augmented reality (AR) involve the expansion of input and output methods.

Virtual reality (VR) technologies generally involve the computer-implemented simulation of up to a 360-degree experience which a user views using, for example, a wearable display (e.g., VR goggles). Augmented reality (AR) technologies generally involve the real-time addition of simulated content into a real-life scene being captured by a user device (e.g., a camera), which the user views through a display device, such that the simulated content appears through the display device to be present in the real-life scene. In both VR and AR technologies, users may provide input through traditional input methods (e.g., keyboards, mice, touchscreens, audio, and the like) as well as through movements and gestures (e.g., captured by motion sensors, cameras, and the like). Interacting in VR and AR environments, thus, may involve the use of an a priori defined set of interactions through sensors and/or physical controllers, which may be unnatural.

Accordingly, improved techniques for interacting with computing systems in VR and AR environments is needed.

BRIEF SUMMARY

Certain embodiments provide a computer-implemented method for interacting with a computing system in a virtual reality or augmented reality environment. An example method generally includes identifying, based on a machine learning model and a streaming natural language input, an intent associated with the streaming natural language input; generating, based on the identified intent associated with the streaming natural language input, one or more virtual objects for rendering in a virtual environment displayed on one or more displays of an electronic device; and rendering the generated one or more virtual objects in the virtual environment.

Other embodiments provide processing systems configured to perform the aforementioned methods as well as those described herein; non-transitory, computer-readable media comprising instructions that, when executed by one or more processors of a processing system, cause the processing system to perform the aforementioned methods as well as those described herein; a computer program product embodied on a computer readable storage medium comprising code for performing the aforementioned methods as well as those further described herein; and a processing system comprising means for performing the aforementioned methods as well as those further described herein.

The following description and the related drawings set forth in detail certain illustrative features of one or more embodiments.

BRIEF DESCRIPTION OF THE DRAWINGS

The appended figures depict certain aspects of the one or more embodiments and are therefore not to be considered limiting of the scope of this disclosure.

To facilitate understanding, identical reference numerals have been used, where possible, to designate identical elements that are common to the drawings. It is contemplated that elements and features of one embodiment may be beneficially incorporated in other embodiments without further recitation.

DETAILED DESCRIPTION

Figure 1:
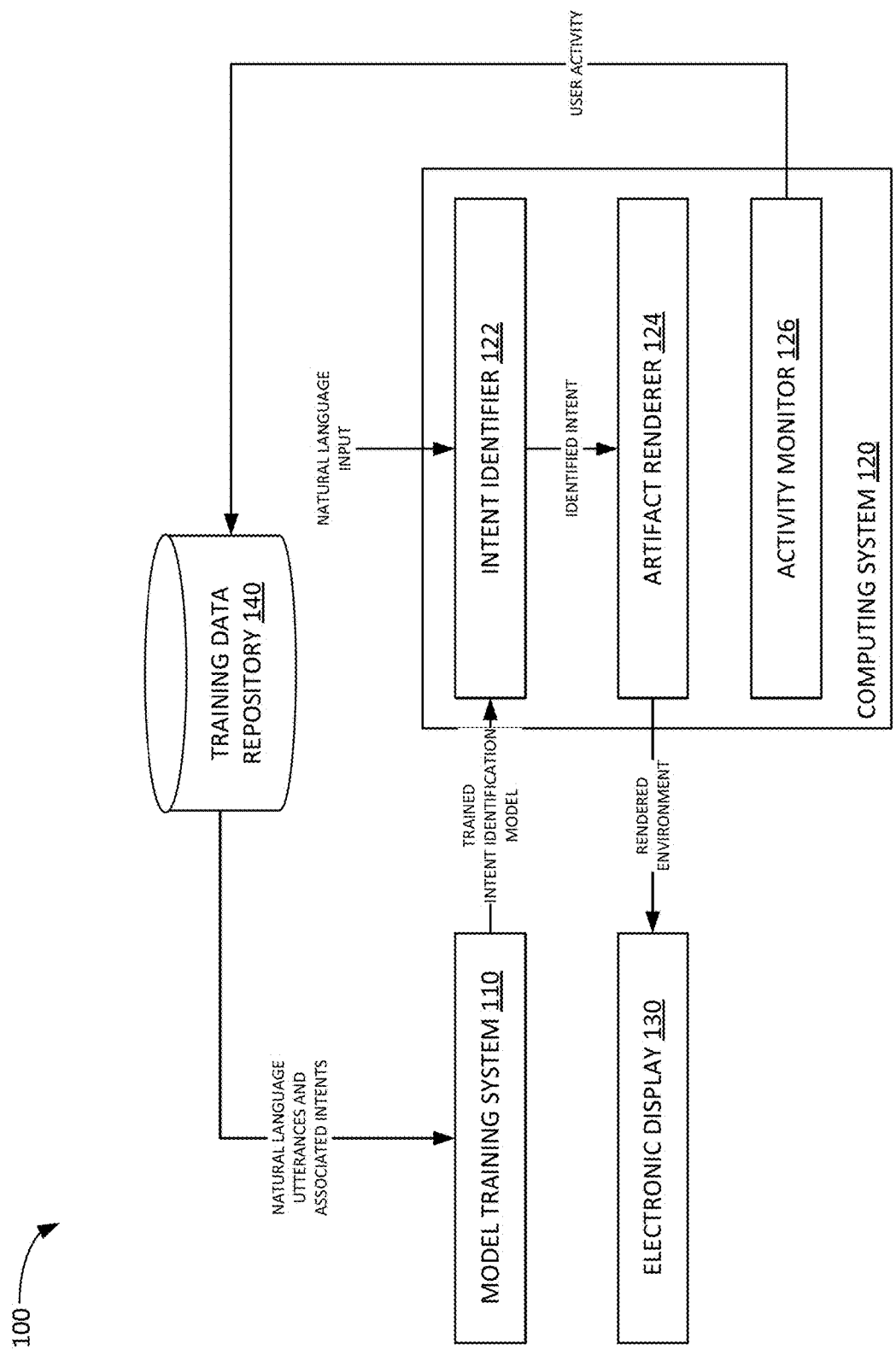
FIG. 1 depicts an example computing environment in which interaction with a computing system executing in a virtual reality or augmented reality environment is performed via machine learning model-based processing of natural language inputs, according to embodiments of the present disclosure.

In virtual reality (VR) and augmented reality (AR) environments, users are presented with a virtual world (in isolation, in a VR application, or overlaid over a view of the real world effectuated through cameras capturing the real world environment or via semi-transparent optics in an AR application). In this virtual world, users can interact with virtual objects using various input mechanisms. Typically, as discussed, users interact with virtual objects in a virtual world using various physical input devices, such as keyboards, mice, dedicated VR/AR environment controllers (e.g., analogue sticks, digital controllers, game system controllers, etc.), or the like. However, because interaction in the real world typically is not performed using such physical input devices, performing activity within a virtual world may be unnatural to users of a VR or AR application.

Speaking, however, is generally a natural technique by which users of an application interact in the real world. To improve how users interact within a virtual world, VR and AR applications may allow for a user to issue various spoken commands which can be processed using natural language techniques. For example, voice-activated assistants can listen to natural language inputs (e.g., captured via one or more microphones coupled with or integral to a device which the user is using to execute a VR or AR application) and determine when a user has uttered a specific activation phrase that activates natural language processing operations within the VR or AR application. However, interacting via spoken commands prefaced by a specific activation phrase is also generally an unnatural manner of communicating or interacting in the real world for many users of a software application.

Embodiments of the present disclosure provide techniques for rendering virtual worlds in VR or AR applications using natural language processing techniques. As discussed in further detail herein, inputs of user utterances may be processed and analyzed in order to determine an intent associated with these user utterances. Based on the determined intent of a user utterance, various graphical elements may be rendered in a virtual world implemented by a VR or AR application, and the user or other users in the virtual world can interact with (or choose not to interact with) these rendered graphical elements. Objects related to various tasks of interest or other intents extracted from natural language utterances may be rendered in a virtual world implemented by a VR or AR environment in real-time (or in near real-time), allowing users in these virtual worlds to interact naturally with the virtual world. In doing so, users of a VR or AR application can manipulate objects in the virtual world presented through the VR or AR application without invoking specific activation phrases, which may accelerate the process of identifying relevant objects to render in a virtual world for the user to subsequently use or manipulate. Further, user interaction and non-interaction with objects associated with detected intents may be tracked, and such information may be used to improve the accuracy of the natural language processing models used to identify intents (and thus, associated objects for rendering) from detected natural language utterances processed by the VR or AR application, which may further improve the accuracy of intent identification and reduce the amount of computing resources (e.g., processing and memory resources) used in rendering objects in a VR or AR application which are not likely to be used by the user of the VR or AR application, thereby improving the functioning of the computing devices involved.

Example Rendering Artifacts in Virtual Worlds Based on Intents Identified from Streams of Natural Language Utterances Using Machine Learning Models FIG. 1 illustrates an example computing environment 100 in which interaction with a computing system executing in a virtual reality or augmented reality environment is performed via machine learning model-based processing of natural language inputs. As illustrated, computing environment 100 includes a model training system 110, computing system 120, electronic display 130, and training repository 140.

Model training system 110 trains machine learning models used by computing system 120 to identify intents in a received natural language utterance and refines these machine learning models based on user interaction with objects rendered by computing system 120 on electronic display 130. Generally, intents in a received natural language utterance may be associated with a specific application for which the machine learning models are deployed (e.g., the application executing on computing system 120 for which a virtual world is rendered on electronic display 130). Intents may be associated, for example, with specific features of the application, specific functions exposed by the application, or the like. For example, in a tax preparation application, different intents may be associated with different portions of a data entry workflow, such as a wage income portion of the workflow, an investment income portion of the workflow, various deduction portions of the workflow, or the like. In another example, in an accounting application, different intents may be associated with different payment, disbursement, and reporting workflows in the application. Of course, it should be recognized that these are only examples of intents associated with features in an application, and other mappings of intents extracted from natural language utterances to applications (and their associated application features) are contemplated.

In some aspects, model training system 110 may train a classifier machine learning model that classifies a natural language utterance as relevant to one of a plurality of intents. To train a classifier machine learning model, model training system 110 can generate a training data set based on historical data in training data repository 140. The training data set may include a plurality of entries, with each entry mapping a natural language utterance—or a relevant portion of a natural language utterance—to a specific intent. The resulting machine learning model may output a probability distribution over a universe of intents, with the highest probability being associated with the intent that is most likely to be associated with the input natural language utterance. When the model is re-trained, natural language utterances that resulted in the generation of a visual artifact rendered on electronic device 130 for which no user interaction was recorded—indicating that there was a mismatch between the identified intent and the predicted intent— model training system 110 can generate and commit to training data repository 140 a new record including the input natural language utterance being mapped to a special value indicating that no intent was relevant for this utterance. For example, a natural language input that resulted in the rendering of an object associated with a specific intent for which no user interaction was recorded may result in the creation of a vector including a natural language utterance being mapped to a null or other special value. As discussed, the machine learning model may be re-trained based on the updated training data in training data repository 140, and the retrained model (which may take into account new and/or corrected mappings of natural language utterances to intents) may be deployed to computing system 120 for use.

In some aspects, model training system 110 may train a large language model (LLM) to identify intents from an input of a natural language utterance (or a string representation of a received natural language utterance). LLMs are generally machine learning models that are trained using large corpuses of natural language inputs and outputs (e.g., documents, transcripts of conversations, and the like). Inputs may be tokenized into a plurality of tokens, and the LLM is generally trained to generate a series of tokens (e.g., words) that are relevant to the inputs. For example, an LLM may be trained to allow a user to input a question or a declarative statement, and the LLM can generate a plurality of tokens that relate to visual artifacts that can be displayed to a user in a virtual world rendered on electronic display 130. In training the LLM, model training system 110 trains the LLM to generate a probability distribution over a plurality of tokens associated with various intents and associated visual artifacts and output the token having the highest probability. In some aspects, the token output by the LLM may be a null token, indicating that no intent was detected in a received input of a natural language utterance. In this example, model training system 110 can initially train the LLM using unsupervised learning techniques and a corpus of documents, and the LLM can be refined using supervised learning techniques with a data set that maps various natural language utterances to intents (and associated artifacts) in an application executing on computing system 120.

Computing system 120 generally hosts an application that may be accessed by users of the application and outputs a rendered virtual world, including one or more objects related to intents detected from natural language utterances, to electronic display 130. As illustrated, computing system 120 includes intent identifier 122, artifact renderer 124, and activity monitor 126.

Intent identifier 122 receives streams of natural language utterances and uses the machine learning model trained by model trainer 110 to identify an intent in these received natural language utterances. To identify an intent in a received natural language utterance, intent identifier 122 can record an audio stream and convert the audio stream into a text string. The converted audio stream may be cleaned to remove irrelevant content, such as stop words, pauses, filler words, or other speech disfluencies. After cleaning the converted audio stream, intent identifier 122 can input the converted audio stream into a machine learning model in order to determine an intent of the utterance.

In some aspects, the machine learning model may be used to initially classify a received natural language utterance (and the tokens derived therefrom) in order to generate contextual information for use in analyzing and determining an intent of subsequent utterances. In some aspects, where the machine learning model is a large language model, a classification may be generated based on tokens (or words) generated as a response to the received natural language utterance. As successive natural language utterances are received (e.g., in a stream of natural language utterances), additional classifications may be performed, conditioned on contextual information associated with previous utterances, in order to determine a collective intent of the received natural language utterances and to identify relevant visual artifacts to generate and render on electronic display 130. The contextual information associated with previous utterances may include, for example, relevant tokens generated in response to those previous utterances, timing relationships between different utterances, importance information, information derived from sensor and/or imagery data indicating user actions performed while the computing system 120 received a natural language utterance, and the like.

The machine learning model uses the generated tokens and the contextual information to generate a response to the received natural language utterances. The generated response to a received natural language utterance may be a series of words or tokens that are contextually relevant to the received natural language utterances. An intent may be identified, for example, based on various tokens included in the generated response. For example, specific words identified in the natural language utterances, contextual information, and tokens generated in response to the received natural language utterances can be used to map various words (or sets of words) to visual artifacts to render in the virtual world rendered on electronic display 130. These visual artifacts may, for example, be associated with specific portions of a workflow in a software application, and the generation of these visual artifacts (as discussed in further detail below) may allow for a user to interact with these objects and invoke the portions of the workflow in the software application associated with these objects.

Take, for example, a tax preparation application in which a user interface is rendered as a virtual world which the user interacts in. An artifact associated with a rental property workflow may be rendered when a user indicates that the user owns rental property which is an income source for a user. To determine an intent to invoke the rental property workflow in the application, intent identifier 122 can process the natural language utterances to determine whether the user actually does own rental property. Because a user can either be a renter or a landlord, intent identifier 122 can process various natural language utterances to determine whether the user owns rental property—thus invoking the rental property workflow—or rents property. A user, however, may not explicitly state that the user owns rental property; thus, to determine whether the user owns rental property and thus intends to invoke the rental property workflow, intent identifier 122 can analyze various utterances (as discussed above) to look for contextual clues that increase the probability that the user owns rental property. In one example, if a natural language utterance of "We are fortunate to have had reliable tenants for a number of years," the machine learning models used by intent identifier 122 can determine that the user owns rental property because the context related to the utterance of "tenants" has a strong relationship with the ownership of rental property. This likelihood may be reinforced by subsequent or previous utterances received at computing system 120. For example, if the user indicates that various equipment was replaced "in our other property," intent identifier 122 can further reinforce the likelihood that the user intends to invoke a rental property workflow, and thus, intent identifier 122 can output an intent to do so to artifact renderer 124.

Artifact renderer 124 uses intents generated by intent identifier 122 in order to render various visual artifacts in a virtual world rendered on electronic display 130. As discussed, intents may be mapped to various visual artifacts which are linked to specific portions of a workflow. In some aspects, as intents are identified by intent identifier 122 and output to artifact renderer 124, artifact renderer 124 can select a visual artifact to render and can render the artifact in one or more specified regions of the virtual world rendered on electronic display 130. For example, in a virtual reality environment, a virtual shelf may be rendered in a designated location in the virtual world, and visual artifacts may be rendered on the virtual shelf. A user can subsequently interact with the visual artifacts on the virtual shelf to invoke specific workflows or indicate that the visual artifact was erroneously generated.

In some aspects, the visual artifacts may be defined apriori. These visual artifacts may be two-dimensional representations that are adjusted for a three-dimensional space in the virtual world or may be three-dimensional objects. In some aspects, the visual artifacts may be generated dynamically. In such a case, various apriori defined visual artifacts may be used as building blocks for a composite visual artifact. As intents are identified by intent identifier 122 and output to artifact renderer 124, artifact renderer 124 can select the relevant visual artifacts and construct a composite visual artifact (e.g., by appending one visual artifact to another visual artifact). For example, in a tax preparation application, visual artifacts may correspond to different forms which the user can include in a tax filing. As the user indicates that various tax situations exist, the associated visual artifacts may be rendered in the virtual world. For example, on an income portion of a tax preparation workflow, visual artifacts for forms associated with wage income, partnership income, investment income, retirement income, and the like may be rendered as the user indicates that these sources of income exist for the user.

Activity monitor 126 monitors user interaction with the generated visual artifacts and commits information about user interaction to training data repository 140 for use in refining the machine learning model(s) used by intent identifier 122 to identify intents (and thus visual artifacts for rendering) from a continuous stream of natural language utterances. In some aspects, activity monitor 126 can monitor activity on a binary basis—that is, whether or not the user interacted with specific visual artifacts rendered by artifact renderer 124 and associated with a specific intent. If a user did not interact with a visual artifact or otherwise took some affirmative action to indicate that the visual artifact was not, in fact, relevant (e.g., dragging the visual artifact to a virtual trash bin or other similar artifact in the virtual world), activity monitor 126 can record such non-interaction or interaction as an indication that the machine learning model(s) used by intent identifier 122 did not accurately identify the intent associated with a continuous stream of utterances. Otherwise, if a user did interact with a visual artifact (e.g., selected the object, manipulated the object, or the like), activity monitor 126 can record such interaction as an indication that the machine learning model(s) used by intent identifier 122 accurately identified the intent associated with a continuous stream of utterances.

In some aspects, activity monitor 126 may record other contextual information that may have relevance to intent identification using the machine learning model(s) deployed to intent identifier 122. For example, activity monitor 126 can record information about an order in which a user interacted with rendered artifacts in the virtual world and use the order information as a proxy for a degree of importance associated with each of the visual artifacts (and associated intents). This information may be recorded in training data repository 140 to use in refining the machine learning model(s) used by intent identifier 122 such that the machine learning model(s) are trained (or refined) to identify more relevant intents from continuous streams of natural language utterances. By training and/or refining the machine learning model(s) to identify more relevant intents from continuous streams of natural language utterances, aspects of the present disclosure may more accurately identify objects to render in a virtual world displayed on electronic display 130, which may in turn reduce energy and compute resource utilization associated with rendering objects which are irrelevant to a user of an application executing on computing system 120.

Figure 2:
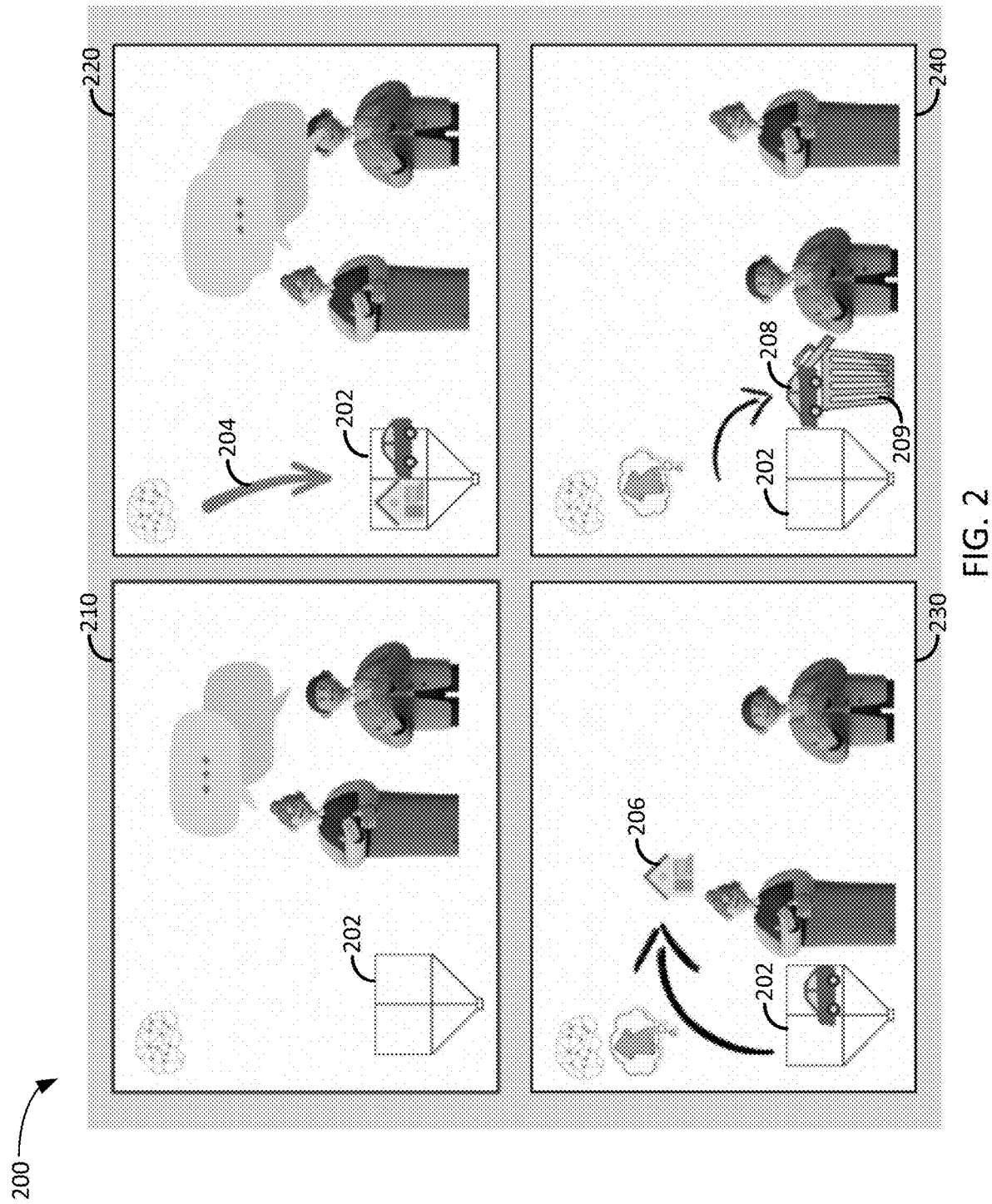
FIG. 2 illustrates an example of a virtual world including visual artifacts rendered based on machine learning model-based processing of natural language inputs, according to embodiments of the present disclosure.

Example Virtual World Including Artifacts Rendered Based on Intents Identified From Streams of Natural Language Utterances Using Machine Learning Models FIG. 2 illustrates an example 200 of a virtual world including visual artifacts rendered based on machine learning model-based processing of natural language inputs, according to embodiments of the present disclosure. The virtual world illustrated in example 200 may be rendered on an electronic display, such as a set of virtual reality glasses or augmented reality glasses (e.g., electronic display 130 illustrated in FIG. 1) based on intents and visual artifacts identified by a computing system on which an application associated with the virtual world executes (e.g., computing system 120 illustrated in FIG. 1).

Frame 210 illustrates an initial state of a virtual world in which users interact using natural language utterances. In this initial state, a designated storage location 202 is defined for the rendering of various visual artifacts associated with intents identified from natural language utterances captured during execution of an application for which the virtual world is rendered.

Frame 220 illustrates a state of the virtual world after a user has input multiple natural language utterances into the software application for which the virtual world is rendered. In this example, the user has input utterances related to a home and a motor vehicle, and one or more machine learning models (e.g., deployed to an intent identifier, such as intent identifier 122 illustrated in FIG. 1) have identified intents 204 to interact with workflows related to the home and the motor vehicle. Thus, to allow for a user to interact with workflows related to the home and the motor vehicle, an artifact renderer can render visual artifacts depicting a home and a motor vehicle (e.g., render visual objects associated with the identified intents 204) and generate an updated storage location 202 including these rendered visual artifacts.

Subsequently, a user can interact with the artifacts rendered in the updated storage location 204. As illustrated in frame 230, a user has selected the home visual artifact 206 to invoke a home workflow in the software application related to the home visual artifact 206. In doing so, the user can remove the home visual artifact 206 from the updated storage location 204 and invoke the home workflow. When the home workflow is invoked, as discussed above, an activity monitor (e.g., activity monitor 126 illustrated in FIG. 1) can determine that the intent associated with the home visual artifact 206 was correctly identified and augment a training data set to include mappings between natural language utterances that resulted in the generation of the home visual artifact 206 and an intent to invoke the home workflow.

Finally, as illustrated in frame 240, the user can indicate that an intent was incorrectly identified from a continuous stream of natural language utterances. In this example, the motor vehicle visual artifact 208 may be selected and moved from the storage location 202 to a trash bin 209 (or other visual artifact that allows a user to discard visual artifacts rendered in the virtual world). In response, the activity monitor can determine that the intent associated with the motor vehicle visual artifact was incorrectly identified and can augmented a training data set to include a mapping between the natural language utterances that resulted in the generation of the motor vehicle visual artifact and a null intent (instead of an intent to invoke a motor vehicle workflow represented by the motor vehicle visual artifact 208).

Figure 3:
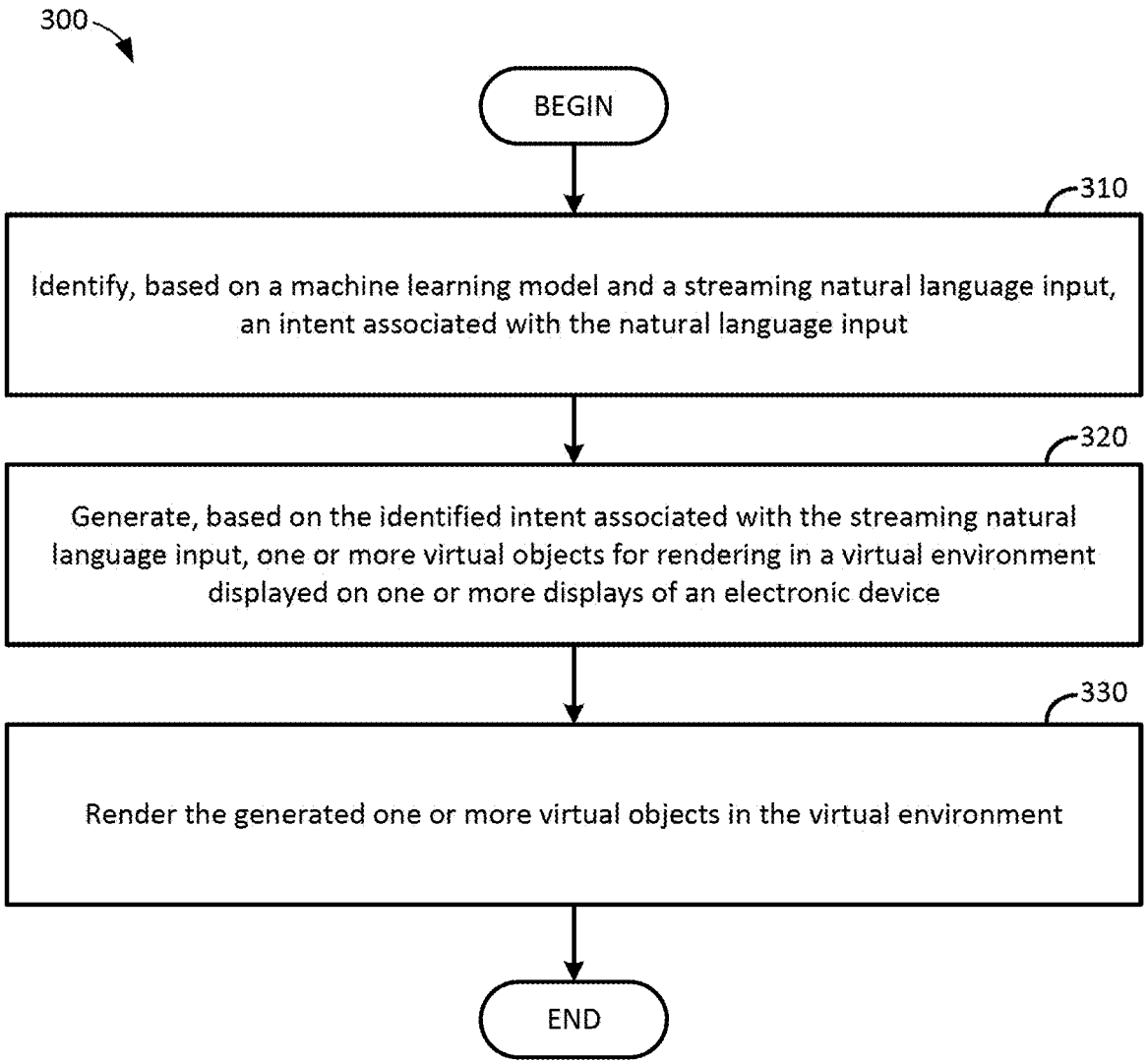
FIG. 3 illustrates example operations for rendering visual artifacts in a virtual reality or augmented reality environment via machine learning model-based processing of streams of natural language inputs, according to embodiments of the present disclosure.

Example Methods for Rendering Artifacts in Virtual Worlds Based on Intents Identified From Streams of Natural Language Utterances Using Machine Learning Models FIG. 3 illustrates example operations 300 that may be performed to render visual artifacts in a virtual reality or augmented reality environment via machine learning model-based processing of streams of natural language inputs, according to embodiments of the present disclosure. Operations 300 may be performed by any computing device which can use one or more machine learning models to identify intents from streams of natural language utterances and render, on an electronic display, virtual worlds and visual artifacts in these virtual worlds based on the identified intents, such as computing system 120 illustrated in FIG. 1.

As illustrated, operations 300 begin at block 310, with identifying, based on a machine learning model and a streaming natural language input, an intent associated with the streaming natural language input.

In some aspects, the machine learning model comprises a classifier model trained to classify a streaming natural language input into one of a plurality of intent categories. Each intent category is generally associated with a respective portion of a workflow in a software application. To identify the intent, an intent category having a highest probability of relevance for the streaming natural language input is identified.

In some aspects, the machine learning model may be a generative model. For example, the generative model may be a large language model trained to generate a plurality of tokens representing a textual answer to the streaming natural language input. The identified intent may be an intent associated with tokens related to a portion of a workflow in a software application. Identifying the intent generally includes identifying the intent based on one or more tokens generated by the generative model based on an input of the streaming natural language input.

At block 320, operations 300 proceed with generating, based on the identified intent associated with the streaming natural language input, one or more virtual objects for rendering in a virtual environment displayed on one or more displays of an electronic device.

In some aspects, generating the one or more virtual objects for rendering in the virtual environment is conditioned, at least in part, on previously generated virtual objects for the streaming natural language input and one or more prior streaming natural language inputs. That is, prior natural language inputs used to generate previous virtual objects may be used as contextual information for the generation of subsequent virtual objects based on subsequent streaming natural language inputs.

At block 330, operations 300 proceed with rendering the generated one or more virtual objects in the virtual environment. In some aspects, the generated one or more objects may be rendered in a defined area of the virtual environment.

In some aspects, operations 300 further include receiving an indication that an object of the one or more virtual objects has been discarded from the virtual environment. A training data set may be updated to reflect that an intent associated with the object is incorrect. For example, the training data set may map the streaming natural language utterances based on which the object was generated to a null intent. The machine learning model is subsequently retrained based on the updated training data set.

In some aspects, operations 300 further include generating an ordered list representing an order in which a user in the virtual environment interacts with the one or more virtual objects, wherein a relative position for a virtual object in the ordered list represents a relative importance of the virtual object amongst the one or more virtual objects. A training data set is updated based on the generated ordered list, and the machine learning model is subsequently retrained based on the updated training data set. In doing so, the machine learning model may use temporal relationships discovered in the ordered list to prioritize the identification of some intents (and the associated rendering of visual objects for these identified intents). For example, the temporal information in these ordered lists may indicate a relevance of various workflows to a user, contextual relationships between different workflows, or the like.

In some aspects, the virtual environment comprises a virtual reality environment rendered on the one or more displays of the electronic device.

In some aspects, the virtual environment comprises an augmented reality environment rendered on one or more displays of the electronic device such that the generated one or more virtual objects are overlaid on a view of a real-world environment visible through the one or more displays of the electronic device.

Figure 4:
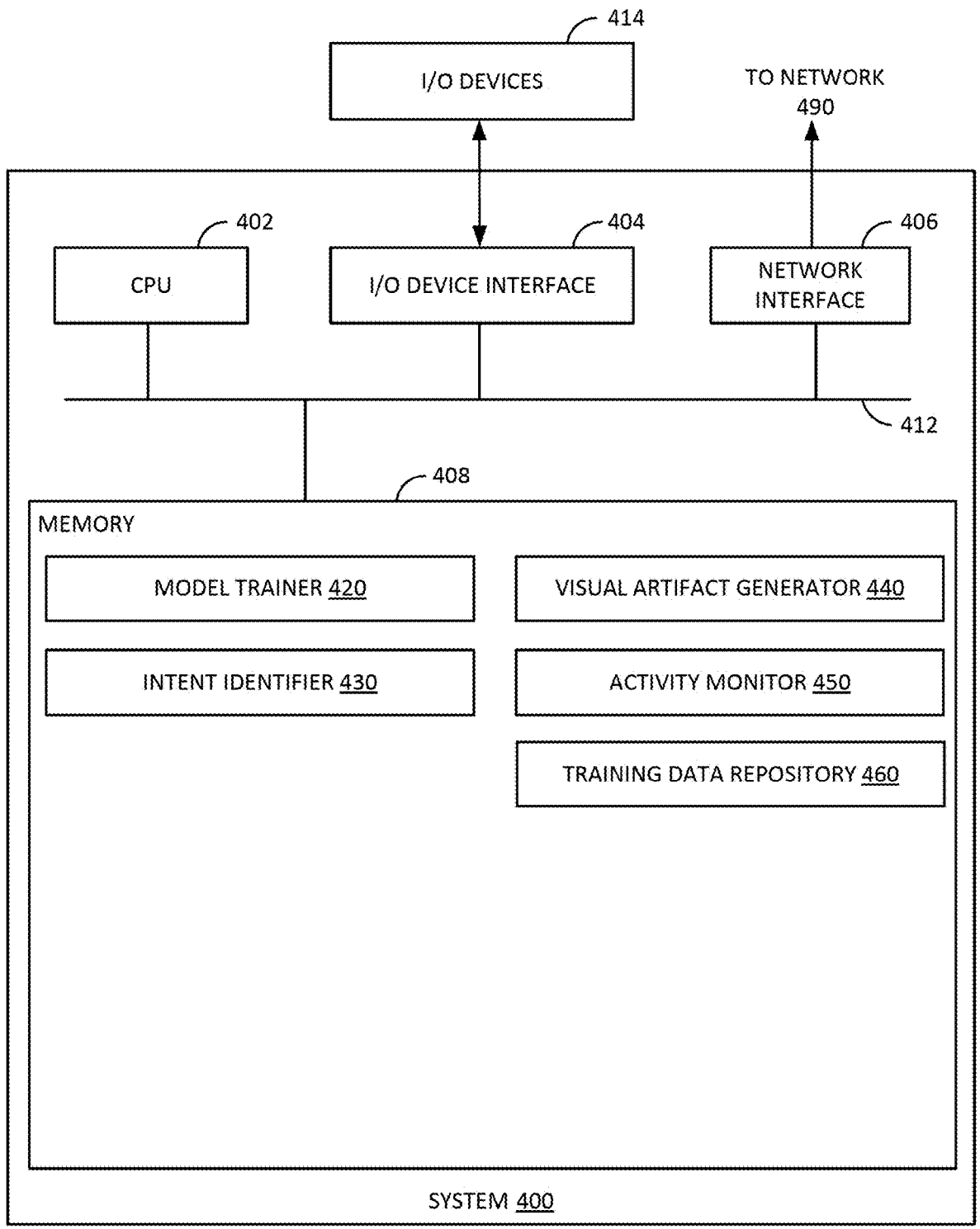
FIG. 4 illustrates an example system on which embodiments of the present disclosure can be performed.

Example System for Rendering Artifacts in Virtual Worlds Based on Intents Identified From Streams of Natural Language Utterances Using Machine Learning Models FIG. 4 illustrates an example system 400 in which predictive risk models are trained and used to place targeted messages in communications generated by a software application for users of the software application. System 400 may correspond to one or both of model training system 110 and computing system 120 illustrated in FIG. 1. In some aspects, system 400 may perform the methods as described with respect to FIG. 3.

As shown, system 400 includes a central processing unit (CPU) 402, one or more I/O device interfaces 404 that may allow for the connection of various I/O devices 414 (e.g., keyboards, displays, mouse devices, pen input, etc.) to the system 400, network interface 406 through which system 400 is connected to network 490 (which may be a local network, an intranet, the internet, or any other group of computing devices communicatively connected to each other), a memory 408, and an interconnect 412.

CPU 402 may retrieve and execute programming instructions stored in the memory 408. Similarly, the CPU 402 may retrieve and store application data residing in the memory 408. The interconnect 412 transmits programming instructions and application data, among the CPU 402, I/O device interface 404, network interface 406, and memory 408.

CPU 402 is included to be representative of a single CPU, multiple CPUs, a single CPU having multiple processing cores, and the like.

Memory 408 is representative of a volatile memory, such as a random access memory, or a nonvolatile memory, such as nonvolatile random access memory, phase change random access memory, or the like. As shown, memory 408 includes a model trainer 420, intent detector 430, visual artifact generator 440, activity monitor 450, and training data repository 460.

Model trainer 420 generally corresponds to model training system 110 illustrated in FIG. 1. Generally, model trainer 420 uses a corpus of labeled and/or unlabeled data from training data repository 460 to train a machine learning model to identify intents from streaming natural language inputs. In some aspects, model trainer 420 may train a classifier machine learning model to identify intents from streaming natural language inputs. In some aspects, model trainer 420 may train a generative model, such as a large language model, to generate output tokens associated with an intent identified in streaming natural language inputs. Model trainer 420 may additionally retrain, or at least refine, the machine learning models based on activity monitored by activity monitor 450 and committed to training data 460 to reflect user interaction (or non-interaction) with visual artifacts associated with intents identified by these machine learning models.

Intent identifier 430 generally corresponds to intent identifier 122 illustrated in FIG. 1. Generally, intent identifier 430 receives a stream of natural language inputs (e.g., audio utterances recorded by one or more input devices of system 400), converts these natural language inputs into string representations, pre-processes these string representations to remove irrelevant content (e.g., stop words, pause words, etc.), and uses the machine learning model(s) trained by model trainer 420 to identify an intent associated with the stream of natural language inputs. In some aspects, intent identifier 430 can use intents identified (or at least preliminarily identified) from prior natural language utterances as contextual information for identifying an intent from a current portion of a stream of natural language inputs.

Visual artifact generator 440 generally corresponds to visual artifact generator 124 illustrated in FIG. 1. Generally, visual artifact generator 440 can generate visual artifacts for rendering on an electronic display integral to or connected with system 400 based on the identified intents for streaming natural language inputs generated by intent identifier 430. These visual artifacts may be rendered in defined locations in a virtual world or virtual environment rendered on the electronic display, and the user of system 400 may subsequently be able to interact with these generated and rendered artifacts.

Activity monitor 450 generally corresponds to activity monitor 126 illustrated in FIG. 1. Generally, activity monitor 450 monitors for user interaction (or non-interaction) with visual artifacts generated in response to intent detection performed on streaming natural language inputs by intent identifier 430. User interaction (or non-interaction), and in some aspects temporal relationships between user interactions, may be recorded in training data repository 460 for use in retraining the machine learning model(s) used by intent identifier 430 to identify an intent of a streaming natural language input.

Note that FIG. 4 is just one example of a system, and other systems including fewer, additional, or alternative components are possible consistent with this disclosure.

Example Clauses

Implementation examples are described in the following numbered clauses:

Clause 1: A computer-implemented method, comprising: identifying, based on a machine learning model and a streaming natural language input, an intent associated with the streaming natural language input; generating, based on the identified intent associated with the streaming natural language input, one or more virtual objects for rendering in a virtual environment displayed on one or more displays of an electronic device; and rendering the generated one or more virtual objects in the virtual environment.

Clause 2: The method of Clause 1, wherein: the machine learning model comprises a classifier model trained to classify a streaming natural language input into one of a plurality of intent categories, each intent category being associated with a respective portion of a workflow in a software application; and identifying the intent associated with the streaming natural language input comprises identifying an intent category having a highest probability of relevance for the streaming natural language input.

Clause 3: The method of any one of Clauses 1 or 2, wherein: the machine learning model comprises a generative model; and identifying the intent associated with the streaming natural language input comprises identifying the intent based on one or more tokens generated by the generative model based on an input of the streaming natural language input.

Clause 4: The method of Clause 3, wherein the generative model comprises a large language model trained to generate a plurality of tokens representing a textual answer to the streaming natural language input, and wherein the identified intent comprises an intent associated with tokens related to a portion of a workflow in a software application.

Clause 5: The method of any one of Clauses 3 or 4, wherein generating the one or more virtual objects for rendering in the virtual environment is conditioned, at least in part, on previously generated virtual objects for the streaming natural language input and one or more prior streaming natural language inputs.

Clause 6: The method of any one of Clauses 1 through 5, wherein rendering the generated one or more objects in the virtual environment comprises rendering the generated one or more objects in a defined area of the virtual environment.

Clause 7: The method of any one of Clauses 1 through 6, further comprising: receiving an indication that an object of the one or more virtual objects has been discarded from the virtual environment; updating a training data set to reflect that an intent associated with the object is incorrect; and retraining the machine learning model based on the updated training data set.

Clause 8: The method of any one of Clauses 1 through 7, further comprising: generating an ordered list representing an order in which a user in the virtual environment interacts with the one or more virtual objects, wherein a relative position for a virtual object in the ordered list represents a relative importance of the virtual object amongst the one or more virtual objects; updating a training data set based on the generated ordered list; and retraining the machine learning model based on the updated training data set.

Clause 9: The method of any one of Clauses 1 through 8, wherein the virtual environment comprises a virtual reality environment rendered on the one or more displays of the electronic device.

Clause 10: The method of any one of Clauses 1 through 8, wherein the virtual environment comprises an augmented reality environment rendered on one or more displays of the electronic device such that the generated one or more virtual objects are overlaid on a view of a real-world environment visible through the one or more displays of the electronic device.

Clause 11: A system, comprising: a memory having executable instructions stored thereon; and a processor configured to execute the executable instructions to perform the methods of any one of Clauses 1 through 10.

Clause 12: A system, comprising: means for performing the methods of any one of Clauses 1 through 10.

Clause 13: A computer-readable medium having instructions stored thereon which, when executed by a processor, performs the methods of any one of Clauses 1 through 10.

Additional Considerations

The preceding description is provided to enable any person skilled in the art to practice the various embodiments described herein. Various modifications to these embodiments will be readily apparent to those skilled in the art, and the generic principles defined herein may be applied to other embodiments. For example, changes may be made in the function and arrangement of elements discussed without departing from the scope of the disclosure. Various examples may omit, substitute, or add various procedures or components as appropriate. Also, features described with respect to some examples may be combined in some other examples.

For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims. Further, the various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

A processing system may be implemented with a bus architecture. The bus may include any number of interconnecting buses and bridges depending on the specific application of the processing system and the overall design constraints. The bus may link together various circuits including a processor, machine-readable media, and input/output devices, among others. A user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer-readable medium. Software shall be construed broadly to mean instructions, data, or any combination thereof, whether referred to as software, firmware, middleware, microcode, hardware description language, or otherwise. Computer-readable media include both computer storage media and communication media, such as any medium that facilitates transfer of a computer program from one place to another. The processor may be responsible for managing the bus and general processing, including the execution of software modules stored on the computer-readable storage media. A computer-readable storage medium may be coupled to a processor such that the processor can read information from, and write information to, the storage medium. In the alternative, the storage medium may be integral to the processor. By way of example, the computer-readable media may include a transmission line, a carrier wave modulated by data, and/or a computer readable storage medium with instructions stored thereon separate from the wireless node, all of which may be accessed by the processor through the bus interface. Alternatively, or in addition, the computer-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module, it will be understood that such functionality is implemented by the processor when executing instructions from that software module.

The following claims are not intended to be limited to the embodiments shown herein, but are to be accorded the full scope consistent with the language of the claims. Within a claim, reference to an element in the singular is not intended to mean "one and only one" unless specifically so stated, but rather "one or more." Unless specifically stated otherwise, the term "some" refers to one or more. No claim element is to be construed under the provisions of 35 U.S.C. § 112(f) unless the element is expressly recited using the phrase "means for" or, in the case of a method claim, the element is recited using the phrase "step for." All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. A computer-implemented method, comprising:
   receiving a natural language input from a user;
   identifying, based on a machine learning model and the natural language input, an intent associated with the natural language input;
   generating, based on the identified intent associated with the natural language input, one or more virtual objects for rendering in a virtual environment displayed on one or more displays of an electronic device;
   rendering the generated one or more virtual objects in the virtual environment;
   receiving an indication that an object of the one or more virtual objects has been discarded from the virtual environment; and
   updating a training data set to reflect that an intent associated with the object is incorrect, wherein the machine learning model is retrained based on the updated training data set.

2. The method of claim 1, wherein:
   the machine learning model comprises a classifier model trained to classify a natural language input into one of a plurality of intent categories, each intent category being associated with a respective portion of a workflow in a software application; and
   identifying the intent associated with the natural language input comprises identifying an intent category having a highest probability of relevance for the natural language input.

3. The method of claim 1, wherein:
   the machine learning model comprises a generative model; and
   identifying the intent associated with the natural language input comprises identifying the intent based on one or more tokens generated by the generative model based on an input of the natural language input.

4. The method of claim 3, wherein the generative model comprises a large language model trained to generate a plurality of tokens representing a textual answer to the natural language input, and wherein the identified intent comprises an intent associated with tokens related to a portion of a workflow in a software application.

5. The method of claim 3, wherein generating the one or more virtual objects for rendering in the virtual environment is conditioned, at least in part, on previously generated virtual objects for the natural language input and one or more prior natural language inputs.

6. The method of claim 1, wherein rendering the generated one or more virtual objects in the virtual environment comprises rendering the generated one or more objects in a defined area of the virtual environment.

7. The method of claim 1, wherein the virtual environment comprises a virtual reality environment rendered on the one or more displays of the electronic device.

8. The method of claim 1, wherein the virtual environment comprises an augmented reality environment rendered on one or more displays of the electronic device such that the generated one or more virtual objects are overlaid on a view of a real-world environment visible through the one or more displays of the electronic device.

9. The method of claim 1, further comprising:
   generating an ordered list representing an order in which a user in the virtual environment interacts with the one or more virtual objects, wherein a relative position for a virtual object in the ordered list represents a relative importance of the virtual object amongst the one or more virtual objects; and
   updating a training data set based on the generated ordered list, wherein the machine learning model is retrained based on the updated training data set.

10. A computer-implemented method, comprising:
    receiving a natural language input from a user;
    identifying, based on a machine learning model and the natural language input, an intent associated with the natural language input;
    generating, based on the identified intent associated with the natural language input, one or more virtual objects for rendering in a virtual environment displayed on one or more displays of an electronic device; and
    rendering the generated one or more virtual objects in the virtual environment;
    generating an ordered list representing an order in which a user in the virtual environment interacts with the one or more virtual objects, wherein a relative position for a virtual object in the ordered list represents a relative importance of the virtual object amongst the one or more virtual objects; and
    updating a training data set based on the generated ordered list, wherein the machine learning model is retrained based on the updated training data set.

11. The method of claim 10, wherein rendering the generated one or more virtual objects in the virtual environment comprises rendering the generated one or more objects in a defined area of the virtual environment.

12. A system, comprising:
    a memory having executable instructions stored thereon; and
    a processor configured to execute the executable instructions in order to cause the system to:
      receive a natural language input from a user;
      identify, based on a machine learning model and the natural language input, an intent associated with the natural language input;
      generate, based on the identified intent associated with the natural language input, one or more virtual objects for rendering in a virtual environment displayed on one or more displays of an electronic device;
      render the generated one or more virtual objects in the virtual environment;
      receive an indication that an object of the one or more virtual objects has been discarded from the virtual environment; and update a training data set to reflect that an intent associated with the object is incorrect, wherein the machine learning model is retrained based on the updated training data set.

13. The system of claim 12, wherein:

the machine learning model comprises a classifier model trained to classify a natural language input into one of a plurality of intent categories, each intent category being associated with a respective portion of a workflow in a software application; and in order to identify the intent associated with the natural language input, the processor is configured to cause the system to identify an intent category having a highest probability of relevance for the natural language input.

14. The system of claim 12, wherein:

the machine learning model comprises a generative model; and in order to identify the intent associated with the natural language input, the processor is configured to cause the system to identify the intent based on one or more tokens generated by the generative model based on an input of the natural language input.

15. The system of claim 14, wherein the generative model comprises a large language model trained to generate a plurality of tokens representing a textual answer to the natural language input, and wherein the identified intent comprises an intent associated with tokens related to a portion of a workflow in a software application.

16. The system of claim 14, wherein in order to generate the one or more virtual objects for rendering in the virtual environment, the processor is configured to cause the system to generate the one or more virtual objects conditioned, at least in part, on previously generated virtual objects for the natural language input and one or more prior natural language inputs.

17. The system of claim 12, wherein in order to render the generated one or more virtual objects in the virtual environment, the processor is configured to cause the system to render the generated one or more virtual objects in a defined area of the virtual environment.

18. The system of claim 12, wherein the processor is further configured to cause the system to:

generate an ordered list representing an order in which a user in the virtual environment interacts with the one or more virtual objects, wherein a relative position for a virtual object in the ordered list represents a relative importance of the virtual object amongst the one or more virtual objects; and update a training data set based on the generated ordered list, wherein the machine learning model is retrained based on the updated training data set.

19. The system of claim 12, wherein the virtual environment comprises a virtual reality environment rendered on the one or more displays of the electronic device.

20. The system of claim 12, wherein the virtual environment comprises an augmented reality environment rendered on one or more displays of the electronic device such that the generated one or more virtual objects are overlaid on a view of a real-world environment visible through the one or more displays of the electronic device.

* * * * *